United States Patent [19]

Bateman et al.

[11] 3,856,752
[45] Dec. 24, 1974

[54] SOLUBLE POLYIMIDES DERIVED FROM PHENYLINDANE DIAMINES AND DIANHYDRIDES

[75] Inventors: John Bateman, Bardonia; David A. Gordon, Scarsdale, both of N.Y.

[73] Assignee: Ciba-Geigy Corporation, Ardsley, N.Y.

[22] Filed: Oct. 1, 1973

[21] Appl. No.: 402,646

[52] U.S. Cl............ 260/65, 117/124 E, 117/128.4, 117/132 B, 117/161 P, 161/197, 161/214, 161/227, 260/30.2, 260/30.4 N, 260/30.6 R, 260/30.8 R, 260/30.8 DS, 260/31.2 N, 260/32.2, 260/32.4, 260/32.6 N, 260/33.4 P, 260/33.8 R, 260/37 N, 260/47 CP, 260/63 N, 260/78 TF, 260/578, 260/580, 260/645, 260/646

[51] Int. Cl............................................. C08g 20/32

[58] Field of Search.... 260/47 CP, 65, 78 TF, 63 N, 260/57 P, 580

[56] References Cited
UNITED STATES PATENTS

| | | | |
|---|---|---|---|
| 3,639,356 | 2/1972 | Bradshaw.................... | 260/78 TF |
| 3,649,596 | 3/1972 | Smith, Jr...................... | 260/47 CP |
| 3,748,338 | 7/1973 | Darmory et al............... | 260/30.2 |
| 3,758,434 | 9/1973 | Kunzel et al.................. | 260/30.2 |

*Primary Examiner*—Lester L. Lee

[57] ABSTRACT

Polyimides with phenylindane diamines and/or dianhydrides incorporated into the polyimide backbone have been found to be soluble in high concentration in polar organic solvents.

14 Claims, No Drawings

SOLUBLE POLYIMIDES DERIVED FROM PHENYLINDANE DIAMINES AND DIANHYDRIDES

SUMMARY OF THE INVENTION

This invention relates to novel soluble polyimides which are characterized by a recurring unit having the following structural formula:

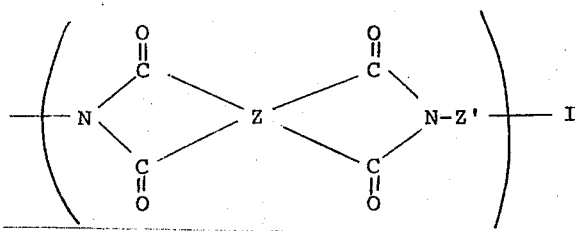

wherein the four carbonyl groups are attached directly to separate carbon atoms, the carbonyl groups being ortho or peri to each other so that five or six membered imide rings are formed respectively;
wherein Z is a tetravalent radical containing at least one aromatic ring; and
wherein Z' is a divalent organic radical selected from aromatic, aliphatic, alkyl aromatic, cycloaliphatic, and heterocyclic radicals, combinations of these, and radicals with heteroatom-containing bridging groups where the heteroatom in the bridge is oxygen, sulfur, nitrogen, silicon or phosphorus, 1. provided that out of the total number of polyimide recurring units A. 0 to 100 percent of such units have Z equal to a phenylindane radical of the structural formula

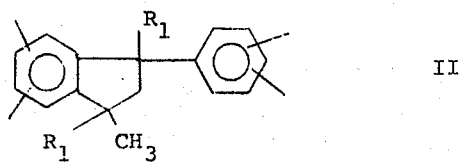

wherein $R_1$ is hydrogen or an alkyl group of from 1 to 5 carbon atoms, and

B. 0 to 100 percent of such units have Z' equal to a phenylindane radical of the structural formula

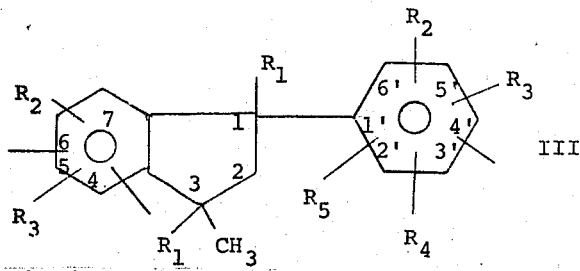

wherein
$R_1$ is hydrogen or an alkyl group of from 1 to 5 carbon atoms, and
$R_2$, $R_3$, $R_4$ and $R_5$ are independently hydrogen, halogen or (lower) alkyl having 1 to 4 carbon atoms, and 2. provided further that out of the total number of Z and Z' radical units, at least 10 percent are phenylindane radical units.

DETAILED DISCLOSURE

The phenylindane diamine component of the novel soluble polyimide can consist of any combination of the isomeric or substituted isomeric diamino compounds represented by formula III above. For example, the phenylindane diamine component can comprise from 0 to 100 percent of 5-amino-1-(4'-aminophenyl)-1,3,3-tri-methylindane in combination with from 100 to 0 percent of 6-amino-1-(4'-aminophenyl)-1,3,3-trimethylindane. Further, either or both of these isomers can be substituted over the entire range from 0 to 100 percent by any of the substituted diamino isomers represented by formula III without impairing the novel soluble nature of these polyimides. Examples of such substituted diamino isomers are 5-amino-6-methyl-1-(3'-amino-4'-methylphenyl)-1,3,3-trimethylindane, 5-amino-1-(4'-amino-Ar',Ar'-dichlorophenyl)-Ar,Ar-dichloro-1,3,3-trimethylindane, 6-amino-1-(4'-amino-Ar',Ar'-dichlorophenyl)-Ar,Ar-dichloro-1,3,3-trimethylindane, 4-amino-6-methyl-1-(3'-amino-4'-methylphenyl)-1,3,3-trimethylindane and Ar-amino-1-(Ar'-amino-2',4'-dimethylphenyl)-1,3,3,4,6-pentamethylindane. The prefixes Ar and Ar' in the above formulas indicate indefinite positions for the given substituents in the phenyl rings.

Characteristic of the solubilizing effect of the phenylindane diamines is their property of imparting solubility to systems composed of aromatic dianhydrides and diamines through partial replacement of the diamine portion. Although the prior art teaches aromatic polyimides are highly insoluble in organic solvents, it has been unexpectedly found that when as little as 20 mole percent of a diamine is replaced with a phenylindane diamine, a highly soluble polyimide is obtained. Thus, soluble polyimides are produced from aromatic dianhydrides such as benzophenone tetracarboxylic acid dianhydride, pyromellitic dianhydride, etc. Such solubilizing effect may be less pronounced in the case of some difficultly soluble aromatic systems. However, in such systems, solubility can still be achieved by further replacement of the diamine portion; for example, by 50 to 100 mole percent replacement by a phenylindane diamine.

Among the phenylindane diamines of the formula III, those are preferred in which $R_1$ is hydrogen or methyl, $R_2$ and $R_3$ independently of one another are hydrogen, methyl, chloro or bromo and $R_4$ and $R_5$ independently of one another are hydrogen, chloro or bromo. More preferred phenylindane diamines of the formula III are those in which R is hydrogen or methyl, $R_2$ and $R_3$ independently of one another are hydrogen, methyl, chloro or bromo, $R_4$ and $R_5$ independently of one another are hydrogen, chloro or bromo, and the amino groups are at positions 5, 6 or 7 and at positions 3' or 4'. Among the phenylindane diamines of the formula III those are most preferred in which $R_1$ is hydrogen or methyl, $R_2$, $R_3$, $R_4$ and $R_5$ are hydrogen, and the amino groups are at positions 5 or 6 and at position 4'.

The phenylindane diamines of this invention may be prepared by various synthetic routes. The most preferable method of preparation is through the acidcatalyzed dimerization of styrene or substituted styrenes to produce the given phenylindane. Then, by subsequent nitration and reduction of the phenylindanes, the phenylindane diamines are produced. One method of achieving alkyl substitution on the aromatic rings of the phenylindane diamines is by subjecting alkyl substituted compounds such as benzaldehyde, acetophenone and the like to a Grignard reaction, followed by water removal to produce the alkyl substituted styrene compound. Dimerization, nitration and reduction can then be effected as mentioned above. Additionally, it has been found that chlorine gas effects direct chlorine substitution on the aromatic rings of diamino-1,3,3-trimethyl-1-phenylindane dihydrochloride to produce chlorinated diaminophenylindanes.

The group Z', as defined above, may be selected from alkylene groups containing from 2 to 12 carbon atoms; cycloalkylene groups containing from 4 to 6 carbon atoms; a xylylene group, arylene groups selected from ortho, meta or para phenylene, xylene, tolylene, biphenylene, naphthylene or anthrylene; a substituted arylene group of the formula

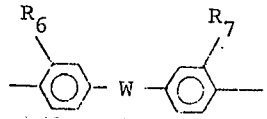

wherein W is a covalent bond, sulfur, carbonyl, —NH, —N-(lower)alkyl, O, S, SS, —N-phenyl, sulfonyl, a linear or branched alkylene group of from 1 to 3 carbon atoms; arylene, especially phenylene group; or a dialkyl or diaryl silyl group; $R_6$ and $R_7$ are independent and each is hydrogen; halogen; especially chloro or bromo; lower alkyl from 1 to 5 carbon atoms, especially methyl; lower alkoxy containing from 1 to 5 carbon atoms, especially methoxy; or aryl, especially phenyl.

More preferably, Z' embraces groups which are derived from the aromatic diamines disclosed in the immediately preceding paragraph. Most preferably, Z' is a group having the formula

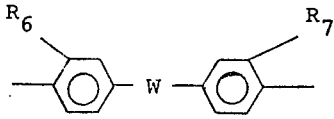

wherein W is a covalent bond, methylene, sulfur, oxygen, or sulfone, and $R_6$ and $R_7$ are independently hydrogen, halogen, or lower alkyl of from 1 to 5 carbon atoms, especially methyl, or a group having the formula

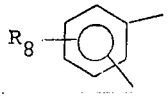

wherein $R_8$ is hydrogen, halogen or lower alkyl of from 1 to 5 carbon atoms, especially methyl.

Among the non-phenylindane diamines that can be employed in the preparation of the polyimides of this invention are aromatic diamines as illustrated below:
4,4'-methylenebis(o-chloroaniline)
3,3'-dichlorobenzidine
3,3'-sulfonyldianiline
4,4'-diaminobenzophenone
1,5-diaminonaphthalene
bis(4-aminophenyl)diethyl silane
bis(4-aminophenyl)diphenyl silane
bis(4-aminophenyl)ethyl phosphine oxide
N-{bis(4-aminophenyl)}N-methyl amine
N-{bis(4-aminophenyl)}N-phenyl amine
4,4'-methylenebis(2-methylaniline)
4,4'-methylenebis(2-methoxyaniline)
5,5'-methylenebis(2-aminophenol)
4,4'-methylenebis(2-methylaniline)
4,4'-oxybis(2-methoxyaniline)
4,4'-oxybis(2-chloroaniline)
5,5'-oxybis(2-aminophenol)
4,4'-thiobis(2-methylaniline)
4,4'-thiobis(2-methoxyaniline)
4,4'-thiobis(2-chloroaniline)
4,4'-sulfonylbis(2-methylaniline)
4,4'-sulfonylbis(2-ethoxyaniline)
4,4'-sulfonylbis(2-chloroaniline)
5,5'-sulfonylbis(2-aminophenol)
3,3'-dimethyl-4,4'-diaminobenzophenone
3,3'-dimethoxy-4,4'-diaminobenzophenone
3,3'-dichloro-4,4'-diaminobenzophenone
4,4'-diaminobiphenyl
m-phenylenediamine
p-phenylenediamine
4,4'-methylenedianiline
4,4'-oxydianiline
4,4'-thiodianiline
4,4'-sulfonyldianiline
4,4'-isopropylidenedianiline
3,3'-dimethylbenzidine
3,3'-dimethoxybenzidine
3,3'-dicarboxybenzidine
diaminotoluene The phenylindane dianhydride component of the novel soluble polyimides useful in this invention has the formula

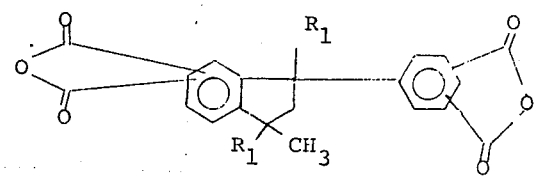

wherein $R_1$ is hydrogen or an alkyl group of from 1 to 5 carbon atoms. illustrative examples of such dianhydrides are 1-(3',4'-dicarboxyphenyl)-1,3,3-trimethylindane-5,6-dicarboxylic acid dianhydride 1-(3',4'-dicarboxyphenyl)-1,3,3-trimethylindane-6,7-dicarboxylic acid dianhydride 1-(3',4'-dicarboxyphenyl)-3-methylindane-5,6-dicarboxylic acid dianhydride 1-(3',4'-dicarboxyphenyl)-3-methylindane-6,7-dicarboxylic acid dianhydride.

These phenylindane dianhydrides are conveniently prepared according to the procedures set forth in U.S. Pat. No. 3,577,442. The individual isomers of these dianhydrides can be employed in this invention as well as the mixed isomers. Where economy in production of the instant polyimides is of paramount importance the mixed isomers are preferable. In the soluble polyimides of this invention these phenylindane dianhydrides can be used in combination with the previously discussed phenylindane diamines and also with the broad range of diamines previously disclosed. Furthermore, from an economy and performance standpoint, it may be advantageous to replace a portion of the phenylindane dianhydride by other dianhydrides of this invention. Thus, it is seen that the phenylindane dianhydrides, whether in combination with other dianhydrides or not, form novel soluble polyimides with the disclosed diamines of this invention, whether or not there is any phenylindane diamine component in the polymeric structure. The only restriction on the composition of the resulting polyimides is that there be sufficient phenylindane moiety in the backbone, whether derived from phenylindane diamine or dianhydride, to give solubility to the resulting polyimide. Thus, in effecting the solubility of an easily solubilized polyimide, the phenylindane moiety can be a relatively minor component of the total diamine and dianhydride content, as for example, 10 to 30 mole percent of the total. On the other hand, in effecting the solubility of a difficultly solubilized polyimide the phenylindane moiety can be a more significant part of the total diamine and dianhydride content, as for example, 30 to 75 mole percent of the total. In an advantageous embodiment of this invention, wherein no phenylindane diamine is present, the phenylindane tetracarboxylic acid dianhydride comprises from 50 to 100 and preferably 75 to 100 mole percent of the aromatic dianhydrides employed.

The other dianhydrides useful in this invention are characterized by the general formula

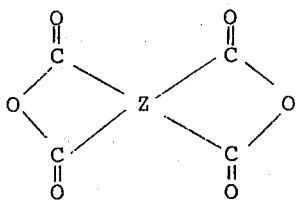

wherein the tetravalent radical

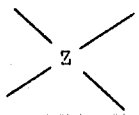

is as heretofore defined and may be selected from the following general groups: aromatic, aliphatic, cycloaliphatic, heterocyclic, combinations of aromatic and aliphatic, and substituted groups thereof. The Z groups may be characterized by the following structures:

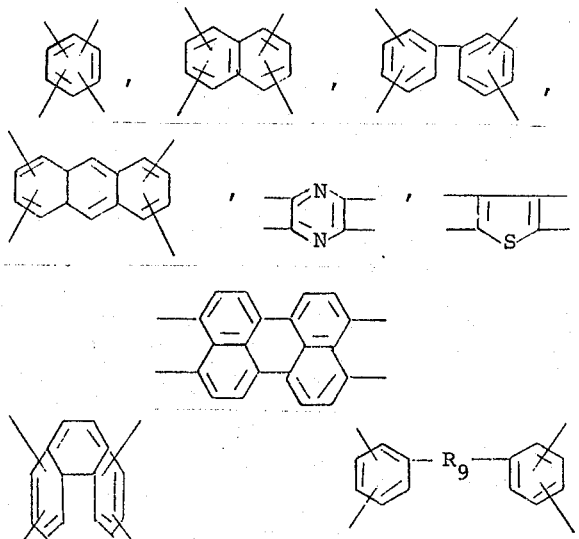

wherein $R_9$ is selected from the group consisting of

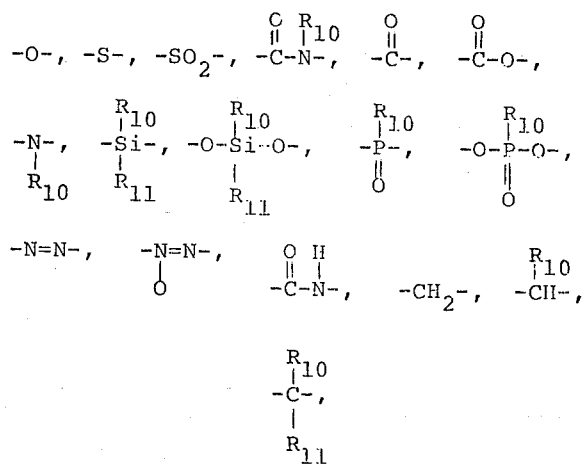

and phenylene, wherein $R_{10}$ and $R_{11}$ are alkyl or aryl, and substituted groups thereof.

The preferred aromatic dianhydrides are those in which the carbon atoms of each pair of carbonyl groups are directly attached to ortho carbon atoms in the Z group to provide a five-membered ring as follows:

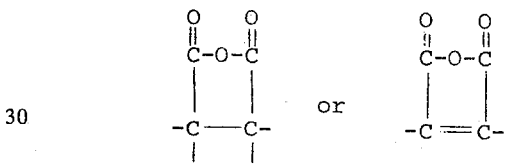

The following species are typical of tetracarboxylic acid dianhydrides suitable for practicing the invention:
2,3,9,10-perylene tetracarboxylic acid dianhydride
1,4,5,8-naphthalene tetracarboxylic acid dianhydride
2,6-dichloronaphthalene-1,4,5,8-tetracarboxylic acid dianhydride
2,7-dichloronaphthalene-1,4,5,8-tetracarboxylic acid dianhydride
2,3,6,7-tetrachloronaphthalene-1,4,5,8-tetracarboxylic acid dianhydride
phenanthrene-1,8,9,10-tetracarboxylic acid dianhydride
2,3,3',4'-benzophenonetetracarboxylic acid dianhydride
pyromellitic dianhydride
3,3',4,4'-benzophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride
4,4'-isopropylidenediphthalic anhydride
3,3'-isopropylidenediphthalic anhydride
4,4'-oxydiphthalic anhydride
4,4'-sulfonyldiphthalic anhydride
3,3'-oxydiphthalic anhydride
4,4'-methylenediphthalic anhydride
4,4'-thiodiphthalic anhydride
4,4'-ethylidenediphthalic anhydride
2,3,6,7-naphthalenetetracarboxylic acid dianhydride
1,2,4,5-naphthalenetetracarboxylic acid dianhydride
1,2,5,6-naphthalenetetracarboxylic acid dianhydride
benzene-1,2,3,4-tetracarboxylic acid dianhydride
pyrazine-2,3,5,6-tetracarboxylic acid dianhydride
thiophene-2,3,4,5-tetracarboxylic acid dianhydride,
and dianhydrides having the general structure:

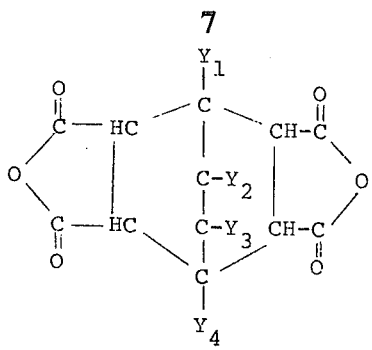

where $Y_1$, $Y_2$, $Y_3$ and $Y_4$ are each members selected from hydrogen, alkyl, aryl and aralkyl.

The most preferred non-phenylindane aromatic dianhydrides are pyromellitic dianhydride, and aromatic dianhydrides characterized by the general formula

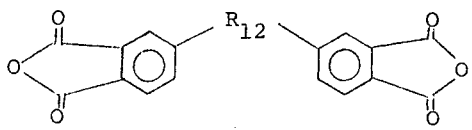

where $R_{12}$ is carbonyl, methylene, oxygen or sulfonyl.

The polyimides produced according to this invention are characterized by useful solubility in certain organic solvents. Polyimides heretofore known to the art have generally been extremely insoluble, and have not been shapeable after conversion from the polyamideacid state to the polyimide form. The polyimides of the invention are extremely useful in that they can be dissolved in certain solvents, in relatively high concentration, and the solutions can be employed for further fabrication of the polyimides. In this way, it is possible to produce polyimide films, coatings, laminates and the like without the necessity of using a polyamide-acid intermediate with a follow-on conversion step. This is highly advantageous, because it permits the application of polyimide coatings to articles which might be damaged by heating or chemical conversion techniques heretofore necessary.

The soluble polyimides display excellent physical, chemical and electrical properties which render them capable of being used as adhesives, laminating resins, especially for printed circuit boards, fibers, coatings, especially for decorative and electrical purposes, films, wire enamels and molding compounds. Solutions of the phenylindane polyimides of this invention can be used to impregnate reinforcing fibers and fabrics like glass, boron, metal oxide whiskers and graphite. These prepregs can then be cured to form rigid polyimide laminates or composites or to form strong thermally resistant structural adhesive bonds between aluminum, stainless steel, titanium or other metals.

These polyimides have very good solubility in common organic solvents. Examples of such organic solvents are the following:

N,N-dimethylformamide
N,N-dimethylacetamide
N-methyl-2-pyrrolidone
N,N-diethylformamide
N,N-diethylacetamide
N-methylcaprolactam
dioxane
dimethylsulfoxide
tetramethylurea
pyridine
dimethylsulfone
hexamethylphosphoramide
tetramethylene sulfone
formamide
N-methylformamide
γ-butyrolactone
tetrahydrofuran
m-cresol
2-methoxyethyl acetate
1,2-dimethoxyethane
bis(2-methoxyethyl) ether
chloroform
nitrobenzene.

The solvents can be used alone, in combinations of solvents, or in combination with poor solvents such as benzene, benzonitrile, xylene, toluene and cyclohexane.

More specifically, these polyimides have been found to be soluble up to more than 60 percent in these solvents. The particular solubility achieved depends on various factors such as the nature of the solvent, the nature of the dianhydride and diamine employed and the extent of any replacement of the phenylindane diamines or dianhydrides of the invention by other diamines or dianhydrides. The solubilities attained are unique because the phenylindane moieties contained in the novel soluble polyimides are themselves aromatic in character and might be expected to impart to their polyimides the generally found characteristic of insolubility among aromatic polyimides. Thus, it is most unusual that these phenylindane diamines and dianhydrides can be reacted with aromatic dianhydrides and diamines to produce the instant soluble polyimides.

The unusually high solubility of the novel polyimides of this invention is not completely understood. However, it appears that the common phenylindane inner structure of both the phenylindane diamines and dianhydrides herein disclosed, said inner structure being represented by the formula

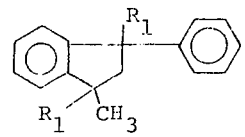

significantly contributes to this solubility. Evidence of this solubilizing activity can be seen from the effect which phenylindane in either its diamine or dianhydride form has on the solubilities of otherwise difficulty soluble aromatic dianhydrides. Pyromellitic dianhydride and 4,4'-methylenedianiline are well known examples of materials, which; in combination with conventional aromatic diamines and dianhydrides generally yield poorly soluble high molecular weight polyimides. Yet, when 5(6)-amino-1-(4'-aminophenyl)-1,3,3-trimethylindane is polymerized with pyromellitic dianhydride a highly soluble polyimide results, e.g., solubility greater than 40 weight percent in dimethylformamide is afforded. Again, when 1-(3',4'-dicarboxyphenyl)-1,3,3-trimethylindane-5,6(6,7)-dicarboxylic acid dianhydride is polymerized with 4,4'-methylenedianiline a very soluble polyimide results.

The polyimides are prepared by a process comprising reacting the above described aromatic primary diamino compounds with dianhydrides in an organic reaction medium which is a solvent for at least one of the reactants, preferably under substantially anhydrous conditions, at a temperature below 100°C and conveniently at room temperature. The product of this reaction is a polyamide acid represented by the following formula:

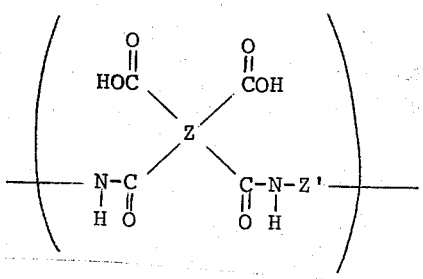

This polyamide acid has a molecular weight such that its inherent viscosity is at least 0.1, preferably 0.3–5.0. The inherent viscosity is measured at 25°C. at a concentration of 0.5 percent by weight of the polymer in a suitable solvent, e.g., N,N-dimethylacetamide, N-methylpyrrolidone, dimethylformamide, etc.

The polyamide acid is subsequently converted to the polyimide by several methods which include heating the polyamide acid solution at temperatures between 100°C and 240°C depending on the boiling point of the organic solvent, until imidization is complete; by chemical means, e.g., by adding to the polyamide acid solution a dehydrating agent such as acetic anhydride alone or in combination with a tertiary amine catalyst such as pyridine and optionally heating or not heating the resulting solution at about 120°C until imidization is complete.

More specifically, the preparation of the polyamide acid which is subsequently converted to the polyimide can be conveniently carried out in a number of ways. The diamines and dianhydrides can be premixed as dry solids in equivalent amounts and the resulting mixture can be added, in small portions and with agitation, to an organic solvent. Alternately, this order of addition can be reversed, i.e., after premixing the diamine and the dianhydride the solvent may be added to the mixture with agitation. It is also possible to dissolve the diamine in the solvent while agitating and to add slowly the dianhydride in portions that provide a controllable rate of reaction. However, this order of addition can also be varied. Still another process involves dissolving the diamine in one portion of a solvent and the dianhydride in another portion of the same or another solvent and then mixing the two solutions.

To effect the conversion of the polyamide acids to the polyimides, the polyamide acids are heated above 50°C and preferably in an inert atmosphere and more preferably in an inert atmosphere between 110°C and 240°C. In the preferred process, the polyamide acids are prepared at a temperature below 50°C and maintained at this temperature until maximum viscosity is obtained denoting maximum polymerization. The polyamide acid in solution and under an inert atmosphere is subsequently heated to about 110°C to 240°C to convert the polyamide acid to the polyimide. The soluble polyimide may be alternatively prepared by mixing the diamine and the dianhydride at room temperature in a solvent such as nitrobenzene and then rapidly heating the mixture to reflux for about 2 to 12 hours.

The soluble polyimides can be precipitated from their solutions by use of methanol, water, acetone, spray drying and the like. The resulting granular material can be molded or redissolved in a suitable solvent to yield a film-forming or varnish type composition. Other appropriate ingredients can be added to the polyimide solutions or molding powders including fillers, dyes, pigments, thermal stabilizers and reinforcing agents, such as glass fiber, carbon, boron and the like, depending on the end use.

The polyimides from phenylindane diamines and dianhydrides are further characterized by high glass transition temperatures, Tg. This makes it possible for the phenylindane polyimides to be used at higher temperatures than many prior art polyimides. Since at temperatures above the transition temperature the polymers lose their stiffness and mechanical properties, any increase in transition temperature is of great importance.

To further illustrate the nature of this invention and the process employed in preparing the soluble polyimides, the following examples are given below.

EXAMPLE 1

1,3,3,-Trimethyl-1-phenylindane

To 6.0 kg. of 62 percent sulfuric acid at 50°C was added 1.0 kg. of α-methyl-styrene over a 5 minute period. The mixture was refluxed (145°C) for 20 hours. After cooling, the lower acid phase was drawn off and discarded. The organic phase was washed with sulfuric acid several times and then with water several times. The product was recrystallized from methanol which afforded 750 g of white crystals with a melting point of 50.5°C–52.0°C. The yield was 75 percent.

By essentially following the above procedure and substituting α,3,4-trimethylstyrene for α-methylstyrene there is obtained a mixture of tetramethyl phenylindanes in 95 percent yield.

EXAMPLE 2

5(6)-Amino-1-(4'-aminophenyl)-1,3,3,-trimethylindane a. Preparation of 5,4'-dinitro- and 6,4'-dinitro-1,3,3,-trimethyl-1-phenylindane isomers To a solution of 236 g (1.0 mole) 1,3,3-trimethyl-1-phenylindane (α-methylstyrene dimer) in 750 ml chloroform at 2–8°C was added a previously mixed solution of 396 ml sulfuric acid and 132 ml nitric acid dropwise over a 2.5 hour period. The two phase reaction mixture was allowed to stir an addtional 4 hours at 5°C. The chloroform phase was isolated and washed with aqeuous sodium bicarbonate until neutral and then with distilled water. A light yellow oil was obtained after drying and stripping the chloroform solution. Two triturations in hexane at room temperature afforded 295 g light yellow powder, melting point 109°–125°. This material was shown to be a mixture of the 5,4'-dinitro- and 6,4'-dinitro-1,3,3,-trimethyl-1-phenylindane isomers by NMR analysis.

Analysis for $C_{18}H_{18}N_2O_4$:
% Calculated: C, 66.25; H, 5.55; N, 8.58
% Found: C, 66.13; H, 5.50; N, 8.42 b. Preparation of 5(6)-Amino-1-(4'-amino-phenyl)-1,3,3-trimethylindane

A mixture of 250 g (0.767 mole) of the dinitro isomers and 250 g (4.60 g - atoms) reduced iron powder in 1 liter 50% aqueous ethanol was brought to reflux and a previously prepared solution of 60 ml concentrated hydrochloric acid in 400 ml 50 percent aqueous ethanol was added over a 1 hour period. Reflux was continued an additional 3 hours, the reaction cooled to 50° and 50 ml concentrated hydrochloric acid added. The reaction mixture was filtered. The filtrate was made basic with 20 percent NaOH and extracted with ether, dried and stripped under vacuum to afford 145 g (71 percent) of a clear brown glassy solid, melting point 47°–54°. NMR analysis indicated the product was 62 percent 6-amino- and 38 percent 5-amino-1-(4'-aminophenyl)-1,3,3-trimethylindane.

Analysis for $C_{18}H_{22}N_2$:
% Calculated: C, 81.18; H, 8.32; N, 10.52
% Found: C, 81.27; H, 8.20; N, 10.48

EXAMPLE 3

Preparation of Polyimide from 5(6)-Amino-1-(4'-aminophenyl)-1,3,3-trimethylindane and benzophenonetetracarboxylic acid dianhydride To a solution of 5.33 g (20 mmoles) of 5(6)-amino-1-(4'-aminophenyl)-1,3,3-trimethylindane as prepared in Example 2 in 67 g N-methylpyrrolidone (NMP) was added 6.44 g (20 mmoles) benzophenonetetracarboxylic acid dianhydride (BTDA) over a 20 minute period. After 24 hours at room temperature, 20 ml acetic anhydride and 5 ml of pyridine were added to imidize the amic acid polymer. Coagulation into acetone afforded to 10.2 g (93 percent) yellow polyimide with an inherent viscosity (0.5 percent, NMP, 25°) 0.55; 40 percent solubility in chloroform, N-methylpyrrolidone, dimethylformamide; TGA main break (5°/min.) 425°C in air, 500°C in nitrogen; Tg (TBA) 320°C.

EXAMPLE 4

Preparation of Polyimide from 5(6)-Amino-1-(4'-aminophenyl)-1,3,3-trimethylindane, (PIDA) 4,4'-Methylenedianiline (MDA) and Benzophenonetetracarboxylic Acid Dianhydride (BTDA)

By essentially following the procedure of Example 3 and successively replacing the phenylindane diamine mixture by 10, 20, 30, 40 and 50 mole percent 4,4'-methylenedianiline, the soluble polyimides set forth in the following table are obtained. These polyimides are all soluble in 20 percent weight concentration in N-methylpyrrolidone (NMP).

| Poly-imide | Mole% Diamine | | Mole% Dianhydride | Inherent Viscosity (0.5%, NMP, 25°C) |
|---|---|---|---|---|
| | MDA | PIDA | BTDA | |
| 1 | 5 | 45 | 50 | 0.45 |
| 2 | 10 | 40 | 50 | 0.55 |
| 3 | 15 | 35 | 50 | 0.50 |
| 4 | 20 | 30 | 50 | 0.61 |
| 5 | 25 | 25 | 50 | 0.64 |
| 6 | 50 | — | 50 | insoluble |

EXAMPLE 5

Preparation of Polyimide from 5(6)-Amino-1-(4'-aminophenyl)-1,3,3-trimethylindane and Pyromellitic Dianhydride Pyromellitic dianhydride (PMDA), 5.37 g, was added over a 5 minute period to a stirring solution of 4.36 g 5(6)-amino-1-(4'-aminophenyl)-1,3,3-trimethylindane in 55 g NMP at room temperature. A strong initial exotherm was noticed but subsided after the last dianhydride addition. Stirring was continued at room temperature for 24 hours. The resulting amic acid was imidized with 20 ml acetic anhydride and 10 ml pyridine by stirring overnight at room temperature. The imidized material, which remained in solution, was coagulated into water, washed with water and dried at 90°C for 24 hours. The inherent viscosity (0.5 percent in NMP, 25°) of this material was 0.18. Torsional Braid Analysis (TBA) showed Tg=390°C.

The weight percent solubilities of this polyimide in various solvents at room temperature are as follows:

| Solvent | Solubility, Wt. % |
|---|---|
| dimethylformamide | > 40 |
| N,N-dimethylacetamide | > 50 |
| N-methylpyrrolidone | > 40 |
| m-cresol | > 30 |
| γ-butyrolactone | > 40 |
| tetrahydrofuran | > 50 |
| 2-methoxyethyl acetate | > 50 |
| 1,2-dimethoxyethane | > 50 |
| bis(2-methoxyethyl)ether | > 50 |
| dioxane | > 50 |
| chloroform | > 40 |

EXAMPLE 6

Preparation of polyimide from 5(6)-Amino-1-(4'-aminophenyl)-1,3,3-trimethylindane (PIDA), 4,4'-Methylenedianiline (MDA) and Pyromellitic Dianhydride (PMDA)

By essentially following the procedure of Example 5 and successively replacing the phenylindane diamine mixture by 10, 20, and 30 mole percent 4,4'-methylenedianiline the soluble polyimides set forth in the following table are obtained. These polyimides are all soluble in 20 percent weight concentration in N-methylpyrrolidone (NMP).

| Poly-imide | Mole % Diamine | | Mole % Dianhydride | Inherent Viscosity (0.5%, NMP, 25°C) |
|---|---|---|---|---|
| | MDA | PIDA | PMDA | |
| 1 | 5 | 45 | 50 | 0.27 |
| 2 | 10 | 40 | 50 | 0.28 |
| 3 | 15 | 35 | 50 | 0.29 |
| 4 | 50 | — | 50 | insoluble |

EXAMPLE 7

Preparation of 1-(3',4'-Dicarboxyphenyl)-1,3,3-trimethylindane-5,6(6,7)-dicarboxylacid dianhydride A mixture of dimers (70 g, 0.24 mole) prepared from α,3,4-trimethylstyrene as in Example 1 was dissolved in 800 ml pyridine and 600 ml water. At reflux 765 g (4.84 moles) $KMnO_4$ was added to the reaction over a 4 hour period along with an additional 1,500 ml water. After refluxing for an additional 2 hours, the pyridine and water were almost entirely removed by distillation and the reaction mixture filtered to remove $MnO_2$. The filtrate was acidified, extracted, stripped and dried to afford 86.5 g (88%) of a mixture of tetra-acids. Dehydration was accomplished at 200°C at 100 mm Hg and afforded an analytically pure sample of dianhydrides:

Analysis for $C_{22}H_{16}O_{10}$:
% Calculated: C, 70.21; H, 4.29
% Found: C, 70.05; H, 4.24

EXAMPLE 8

Preparation of Polyimide from 1-(3',4'-dicarboxyphenyl)-1,3,3-trimethylindane-5,6(6,7)-dicarboxylacid dianhydride and 4,4'-methylene dianiline A stoichiometric mixture of the phenylindane dianhydride obtained in Example 7 and 4,4'-methylene dianiline was reacted at room temperature in N-methylpyrrolidone solvent and imidized as described in Example 3. The light yellow polyimide product had an inherent viscosity (0.5 percent, N-methylpyrrolidone, 25°) of 0.31 and was soluble in N-methylpyrrolidone, dimethyl-formamide, dimethylacetamide, tetrahydrofuran and cresol.

EXAMPLE 9

By essentially following the procedure of Example 8, soluble polyimides are obtained by reacting equivalent amounts of 1-(3',4'-dicarboxyphenyl)-1,3,3-trimethylindane-5,6(6,7)-dicarboxylic acid dianhydride and the following aromatic diamines:
a. 4,4'-methylenebis(o-chloroaniline)
b. 4,4'-oxydianiline
c. 4,4'-thiodianiline
d. 4,4'-sulfonyldianiline

EXAMPLE 10

By essentially following the procedure of Example 9, and replacing the phenylindane dianhydride by 25 and 50 mole percent of benzophenone tetracarboxylic acid dianhydride soluble polyimides are obtained with the following aromatic diamines:
a. 4,4'-methylenebis(o-chloroaniline)
b. 4,4'-oxydianiline
c. 4,4'-thiodianiline
d. 4,4'-sulfonyldianiline

EXAMPLE 11

Preparation of 6-Amino-1-(4'-aminophenyl)-1,3,3-trimethylindane

To a mixture of 16.2 g (50 mmoles) 1-(4'-carboxyphenyl)-1,3,3-trimethyl-6-indane carboxylic acid in 400 ml chloroform and 60 ml conc. $H_2SO_4$ at 40°C was added portionwise over a ½-hour period, 7.8 g (120 mmoles) sodium azide. The resulting mixture was heated for 2 hours at 55°, cooled to room temperature and allowed to stand overnight. Water (200 ml) was added and the mixture stirred for 1 hour. The chloroform layer was drawn off, washed with water, dried over $K_2CO_3$ and stripped to afford a brownish oil. This oil was dissolved in 700 ml hot heptane, filtered and allowed to crystallize. Filtration afforded 0.6 g (79 percent) of an off-white powder, melting point 91°–92°, which was consistent with the desired 6-amino-1-(4-aminophenyl)-1,3,3-trimethylindane.

Analysis for $C_{18}H_{22}N_2$:
% Calculated: C, 81.18; H, 8.32; N, 10.52
% Found: C, 81.30; H, 8.40; N, 10.47

EXAMPLE 12

Preparation of Polyimide from 6-Amino-1-(4'-aminophenyl)-1,3,3-trimethylindane and benzophenonetetracarboxylic acid dianhydride To a solution in 50 g N-methylpyrrolidone of 5.168 g (19.4 mole) of the pure 6-amino diamine, prepared in the previous example, was added, over a 5 minute period, 6.444 g (20 mmoles) benzophenone-tetracarboxylic acid dianhydride (BTDA). The solution immediately became warm and noticebly viscous. The solution was allowed to cool to room temperature and stand for 18 hours. 20 ml of acetic anhydride and 10 ml pyridine were added and the reaction mixture heated on a steam plate for 5 hours. The solution was then coagulated into 1 liter acetone to afford a light yellow fibrous polymer. An I.R. spectrum showed no amic acid bands. Inherent viscosity (0.5 percent in N-methylpyrrolidone, 25°) was 0.55. TBA showed Tg=329°. The material was 40 percent soluble in N-methylpyrrolidone, N,N-dimethylacetamide, dimethyl-formamide and $CHCl_3$.

EXAMPLE 13

α, p-Dimethylstyrene

To 630 ml of a solution of 226.6 g (1.9 moles) of methyl magnesium bromide in ether which was stirred in a reaction flask equipped with nitrogen inlet and drying tube was added a solution of 214 g (1.6 moles) of 4'-methyl acetophenone in 500 ml ether. Addition was accomplished over a 2.45 hour period while the internal temperature was maintained at 8°–12°C. The mixture was then stirred for 0.5 hour at room temperature and 1 hour at reflux. The mixture was cooled to 10°C and 300 ml 25% $NH_4CL$ was added over a 0.5 hour period while an internal temperature of 15°–20°C was maintained. The liquid top layer was decanted from the bottom layer. This bottom layer was boiled twice in 300 ml ether each time. The ether from these boilings was filtered, added to the initially decanted top layer, and the total ether solution was dried over $MgSO_4$. Filtration and stripping off of volatiles at 50°C and 14 mm Hg produced 230 g of an oil (96 percent yield).

229 g (1.5 moles) of the dimethyl-p-methylphenyl-carbinol produced above was added to a reaction flask which was equipped with nitrogen inlet and take-off condenser. This carbinol was heated by means of an oil bath. When the oil bath temperature reached 115°C, the clear material became cloudy and the presence of water globules was noticed. Further heating to an oil bath temperature of 140°C resulted in the distillation of 24 ml of water together with 11 ml of organic material. On subsequent distillation of the remaining material in the flask through a vigreaux column 158.5 g of α, p-dimethylstyrene (80 percent yield) was produced, boiling point 75°–77°C/14 mm Hg.

EXAMPLE 14

6-Methyl-1-(4'-methylphenyl)-1,3,3-trimethylindane

A solution of 150 g (1.14 moles) α,p-dimethylstyrene in 190 ml of toluene was added with stirring over a 1 hour period to a reaction flask containing 450 ml of toluene and 83 ml of concentrated $H_2SO_4$. The reaction temperature during this addition was maintained at 5°–7°C. The reaction mixture was allowed to stir for 1 hour at 5°–10°C and 1 hour at 20°C. The upper toluene layer was then separated from the reaction mixture.

The lower layer was extracted with 100 ml toluene and then the combined toluene layers were dried over a MgSO₄-K₂CO₃ mixture. The dried material was filtered and volatiles were removed at 75°C and 14 mm Hg to yield 145 g of a viscous yellow-brown oil. 150 ml of methanol was added to this oil. This mixture afforded 135 g of white crystals, melting point 37°–38.5°C (89.5 percent yield).

EXAMPLE 15

5-Amino-6-methyl-1-(3'-amino-4'-methylphenyl)-1,3,3-trimethylindane a. 5-Nitro-6-methyl-1-(3'-nitro-4'-methylphenyl)-1,3,3-trimethylindane To a solution of 6.5 g (.025 mole) 6-methyl-1-(4'-methylphenyl)-1,3,3-trimethylindane in 19 ml chloroform at 5°C was added with stirring a previously mixed solution of 10 ml sulfuric acid and 3.3 ml nitric acid over a 1.5 hour period. The resultant mixture was stirred 3 hours at 5°C. The chloroform phase was isolated, washed with aqueous sodium bicarbonate until neutral and then with water, and dried over MgSO₄. 8.1 g of a thick oil was obtained after stripping of the chloroform solution. This oil was taken up in 30 ml hexane and afforded 4.3 g crystalline solid, melting point 99°–112°C (50 percent yield).

Analysis for $C_{20}H_{22}N_2O_4$:
Calculated: C, 67.78; H, 6.26; N, 7.90
Found: C, 67.96; H, 6.65; N, 7.64 b. 5-Amino-6-methyl-1-(3'-amino-4'-methylphenyl)-1,3,3-trimethylindane 0.4 g of 10 percent palladium on charcoal was added to a solution of 4 g (.011 mole) of the dinitro compound (see (a) above) in 80 ml ethyl acetate under a nitrogen atmosphere. Reduction of the mixture was then carried out by means of the Parr Hydrogenator over a period of 20 hours. The mixture was filtered and the filtrate stripped to produce an oil. This oil was dissolved in ether, extracted with dilute acid, neutralized with base, and re-extracted with additional ether. Subsequent drying, filtering and stripping afforded 3.8 g of a viscous syrup. NMR analysis indicated that 5-amino-6-methyl-1-(3'-amino-4'-methylphenyl)-1,3,3-trimethylindane was the predominant product.

EXAMPLE 16

Chlorination of 5(6)-Amino-1-(4'-aminophenyl)-1,3,3-trimethylindane hydrochloride 102 g (0.3 mole) of 5(6)-amino-1-(4'-aminophenyl)-1,3,3-trimethylindane hydrochloride (prepared by acidification of the diamine) was dissolved in a previously mixed solution of 125 ml concentrated hydrochloric acid and 750 ml water. Chlorine was bubbled into the brown solution maintained at 3°–7°C over a period of 50 minutes. A mild exotherm was noted and a brown solid separated during the chlorine addition. After addition was complete, the reaction mixture was stirred for 3 hours with a gradual increase of the temperature from 5 to 25°C. The reaction mixture was next diluted with 1250 ml water and the insoluble brown solid filtered. The solid was triturated with water, filtered, further washed with water, filtered and finally dried at 35°–40°C and 7 mm Hg. for 132 hours to constant weight. The yield was 110 g (91 percent), melting point 160°–180°C (dec).

Analysis for $C_{18}H_{18}N_2Cl_4$:
Calculated: C, 53.49; H, 4.49; N, 6.93; Cl, 35.09
Found: C, 52.07; H, 4.38; N, 7.76; Cl, 31.31

EXAMPLE 17

By essentially following the procedure of Example 3, and replacing the 5(6)-amino-1-(4'-amino-phenyl)-1,3,3-trimethylindane reacted in that example by the following aromatic diamines:

a. 5-amino-6-methyl-1-(3'-amino-4'-methylphenyl)-1,3,3-trimethylindane; and b. an isomeric mixture of 5-amino-1-(4'-amino-Ar',Ar'-dichlorophenyl)-Ar,Ar-dichloro-1,3,3-trimethylindane and 6-amino-1-(4'-amino-Ar',Ar'-dichlorophenyl)-Ar,Ar-dichloro-1,3,3-trimethylindane, there are obtained soluble polyimides.

EXAMPLE 18

By essentially following the procedure of Example 3, soluble polyimides are obtained by reacting equivalent amounts of 5(6)-amino-1-(4'-aminophenyl)-1,3,3-trimethylindane and the following aromatic dianhydrides:

a. 4,4'-oxydiphthalic anhydride
b. 4,4'-thiodiphthalic anhydride
c. 4,4'-sulfonyldiphthalic anhydride
d. 4,4'-methylene diphthalic anhydride
e. 4,4'-ethylidenediphthalic anhydride
f. 3,4,3',4'-tetracarboxylic triphenylamine dianhydride
g. 3,4,3',4'-tetracarboxylic tetraphenylsilane dianhydride
h. 3,4,3',4'-tetracarboxylic tetraphenylsiloxane dianhydride
i. 3,4,3',4'-tetracarboxylic triphenylphosphine oxide dianhydride
j. 3,4,3',4'-tetracarboxylic triphenylphosphate dianhydride
k. 1-(3',4'-dicarboxyphenyl)-1,3,3-trimethylindane-5,6(6,7)-dicarboxylic acid dianhydride

What is claimed is:

1. A soluble polyimide consisting essentially of the recurring unit having the formula

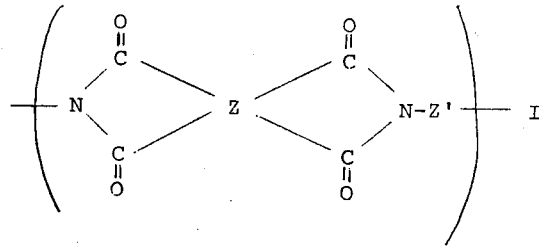

wherein the four carbonyl groups are attached directly to separate carbon atoms, the carbonyl groups being ortho or peri to each other so that five or six membered imide rings are formed respectively;

wherein Z is a tetravalent radical containing at least one aromatic ring; and wherein Z' is a divalent organic radical selected from aromatic, aliphatic, alkyl aromatic, cycloaliphatic, and heterocyclic radicals, combinations of these, and radicals with heteroatom-containing bridging groups where the heteroatom in the bridge is oxygen, sulfur, nitrogen, silicon or phosphorus, provided that 1. out of the total number of polyimide recurring units
   A. 0 to 100 percent of such units have Z equal to a phenylindane radical of the structural formula

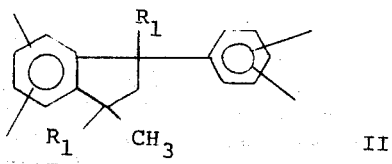   II wherein $R_1$ is hydrogen or an alkyl group of from 1 to 5 carbon atoms, and B. 0 to 100 percent of such units have Z' equal to a phenylindane radical of the structural formula

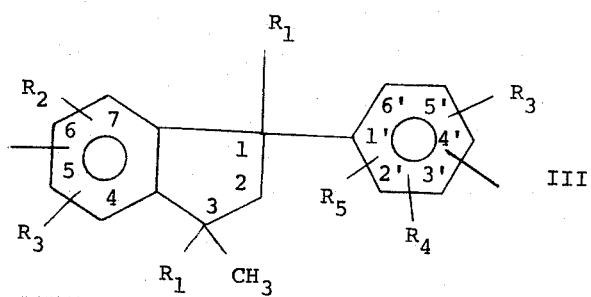   III wherein
   $R_1$ is hydrogen or alkyl group of from 1 to 5 carbon atoms, and
   $R_2$, $R_3$, $R_4$ and $R_5$ are independently hydrogen, halogen or (lower)alkyl having 1 to 4 carbon atoms, 2. out of the total number of Z and Z' radical units, at least 10 percent are phenylindane radical units, and 3. the polyamide acid, from which the soluble polyimide is produced, has an inherent viscosity of at least 0.1, measured at 25°C at a concentration of 0.5 percent by weight of the polymer in N,N-dimethylacetamide, N-methylpyrrolidone, or dimethylformamide.

2. A polyimide of claim 1 wherein the Z radical units are equal to (a) 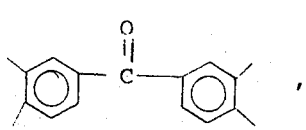, (b) 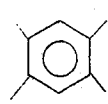, (c) a mixture of

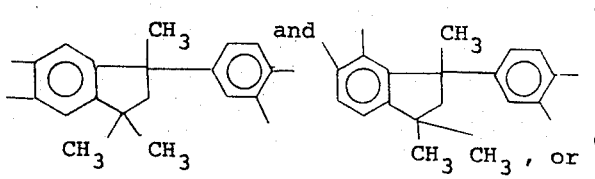

(d) any mixture of said radical units, and the Z' radical units are equal to (1) a radical of structural formula III wherein $R_1$, $R_2$, $R_3$, $R_4$ and $R_5$ are independently hydrogen or methyl, (2) 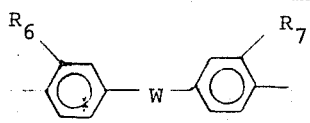, wherein W is a covalent bond, methylene, sulfur, oxygen or sulfone and $R_6$ and $R_7$ are independently hydrogen, halogen or lower alkyl of form 1 to 5 carbon atoms, (3) 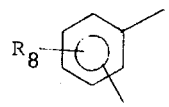

wherein $R_8$ is hydrogen, halogen or lower alkyl of from 1 to 5 carbon atoms, or (4) any mixture of said radical units.

3. A polyimide of claim 2, wherein the Z' radical units are exclusively equal to a radical of structural formula III and $R_1$, $R_2$, $R_3$, $R_4$ and $R_5$ are as defined in claim 2.

4. A polyimide of claim 2, wherein 100 to 10 percent of the Z' radical units are equal to a radical of structural formula III and $R_1$, $R_2$, $R_3$, $R_4$ and $R_5$ are as defined in claim 2, while 0 to 90 percent of such units are equal to (a) 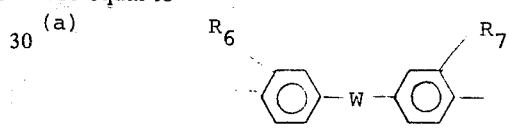

wherein $R_6$, $R_7$ and W are as defined in claim 2, (b) 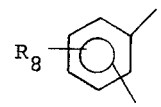

wherein $R_8$ is defined as in claim 2 or (c) any mixture of said radical units.

5. A polyimide of claim 2, wherein 0 to 100 percent of the Z radical units are equal to (a) 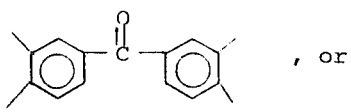, or (b) , while 100 to 0 percent of such units are equal to a mixture of

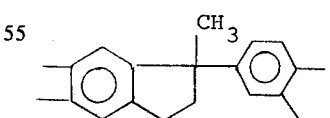

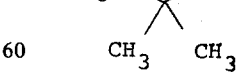 and

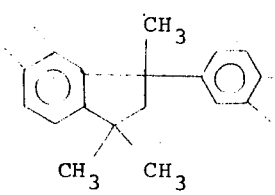.

6. A polyimide of claim 2, wherein the Z' radical units are exclusively equal to a radical of structural formula III and $R_1$, $R_2$, $R_3$, $R_4$ and $R_5$ are as defined in claim 2, and the Z radical units are equal to a mixture of

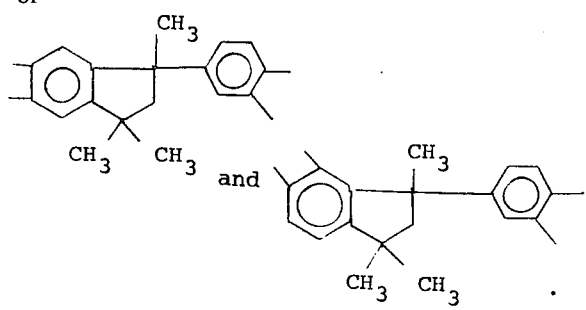

7. A polyimide of claim 2, wherein the Z' radical units are equal to a mixture of

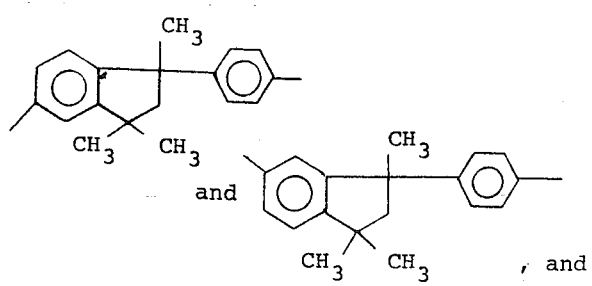

the Z radical units are equal to

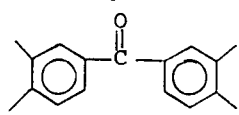

8. A polyimide of claim 2, wherein the Z' radical units are equal to a mixture of

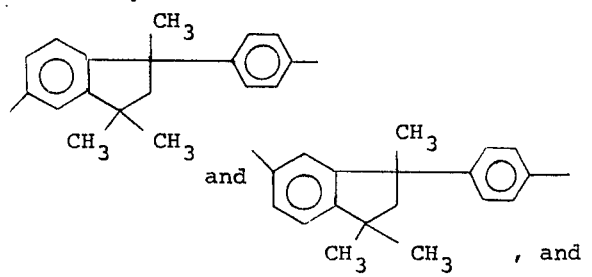

the Z radical units are equal to

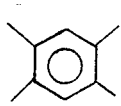

9. A polyimide of claim 2, wherein the Z' radical units are equal to a mixture of

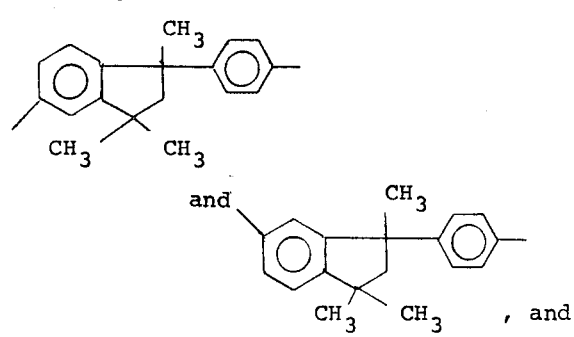

the Z radical units are equal to a mixture of

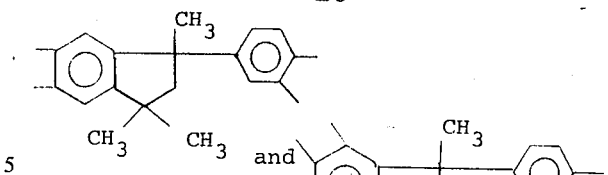

10. A polyimide of claim 2, wherein the Z' radical units are equal to

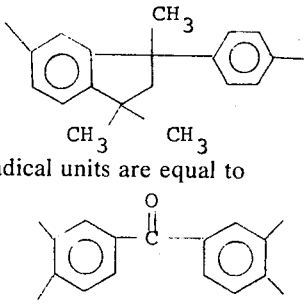

and the Z radical units are equal to

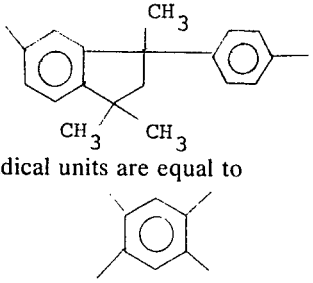

11. A polyimide of claim 2, wherein the Z' radical units are equal to

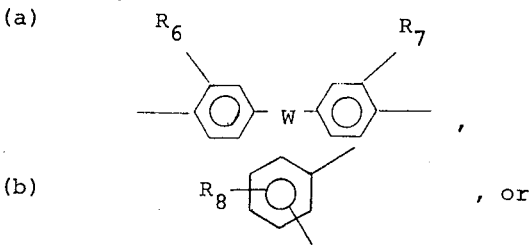

and the Z radical units are equal to

12. A polyimide of claim 2, wherein the Z' radical units are equal to (a)

(b)        , or (c) any mixture of said radical units, wherein $R_6$, $R_7$, $R_8$ and W are as defined in claim 2 and the Z radical units are equal to a mixture of

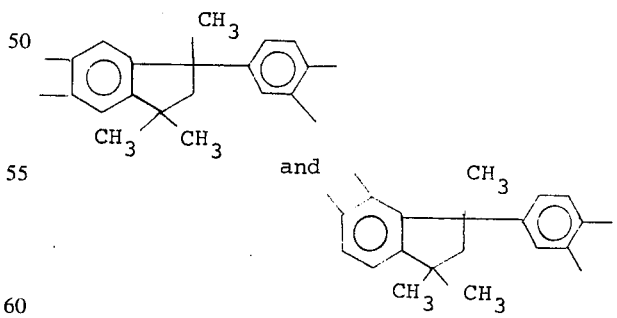

13. A polyimide of claim 2, wherein the Z' radical units are equal to

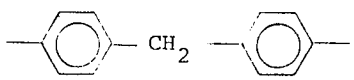

14. A composition of matter which is comprised of a soluble polyimide of formula I of claim 1 in an organic solvent.

* * * * *